(12) United States Patent
Bauer et al.

(10) Patent No.: US 8,990,349 B2
(45) Date of Patent: Mar. 24, 2015

(54) IDENTIFYING A LOCATION OF A SERVER

(75) Inventors: Daniel Nikolaus Bauer, Birmensdorf (CH); Christopher J. Giblin, Zurich (CH); John G. Rooney, Alpes-Maritimes (FR)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/367,573

(22) Filed: Feb. 9, 2009

(65) Prior Publication Data

US 2009/0204690 A1    Aug. 13, 2009

(30) Foreign Application Priority Data

Feb. 12, 2008   (EP) ..................................... 08101525

(51) Int. Cl.
*G06F 15/16*    (2006.01)
*H04L 29/06*    (2006.01)
*H04W 4/02*    (2009.01)
*H04L 29/08*    (2006.01)

(52) U.S. Cl.
CPC ........ *H04L 63/1441* (2013.01); *H04L 63/1483* (2013.01); *H04W 4/02* (2013.01); *H04L 67/18* (2013.01)
USPC .......................................... 709/219; 709/206

(58) Field of Classification Search
CPC .............. H04L 29/08072; H04L 29/06; H04L 29/0809
USPC ........................................................... 709/219
See application file for complete search history.

(56) References Cited

U.S. PATENT DOCUMENTS

| 6,975,619 | B1 | 12/2005 | Byers | |
|---|---|---|---|---|
| 2003/0187949 | A1 | 10/2003 | Bhatt | |
| 2005/0021601 | A1* | 1/2005 | Longoni et al. | 709/203 |
| 2006/0117038 | A1* | 6/2006 | Toebes et al. | 707/100 |
| 2006/0168066 | A1* | 7/2006 | Helsper et al. | 709/206 |
| 2007/0055749 | A1* | 3/2007 | Chien | 709/219 |
| 2009/0164472 | A1* | 6/2009 | Huang et al. | 707/10 |
| 2009/0216720 | A1* | 8/2009 | Piche et al. | 707/3 |

* cited by examiner

*Primary Examiner* — Jerry Dennison
*Assistant Examiner* — Steven Nguyen
(74) *Attorney, Agent, or Firm* — Cantor Colburn LLP

(57) ABSTRACT

A method for identifying a geographic location of a server. A request is delivered to the server to send back a message via a cellular network; the message of the server is received via a cell of the cellular network; cell location information about the geographic location of the cell that received the message is delivered; the cell location information is used as information about the geographic location of the server.

17 Claims, 2 Drawing Sheets

1

IDENTIFYING A LOCATION OF A SERVER

CROSS REFERENCE TO RELATED APPLICATION

This application claims priority under 35 U.S.C. 119 from European Patent Application 08101525.7 filed Feb. 12, 2008, the entire contents of which are incorporated herein by reference.

BACKGROUND OF THE INVENTION

1. Field of the Invention

The invention relates to identifying a location of a server and to a location server for such identification.

2. Description of Related Art

Using the Internet for exchanging data is a well-known and comfortable technique. However, attempts to obtain personal and/or confidential information for illegal or unauthorized purposes in the Internet may occur. In one method, called "phishing," a fraudulent person or organization sends one or more e-mails including a hyperlink to a phishing web site that enables a user to enter personal or confidential information. Internet phishing web sites make people believe that they are entering a genuine official website of a corporation or another organization. These phishing websites typically accomplish this by giving their website an official look.

For this reason, security protocols such as SSL require that a server authenticate itself to a client before a connection is established. This authentication requires the transfer of a certificate from the server to a client. This certificate contains the identity of the server and is signed by a certificate authority. If the user trusts the signer, then they can also trust the server. When the SSL connection is established, a small lock icon is typically used by the browser to indicate to the user that the site is trustworthy and that all communication with it will be encrypted.

US patent application publication US 2007/0055749 A1 discloses a method and system for identifying a network resource as a phishing website. In an embodiment, a web browser receives a web page that includes a resource identifier, such as a URL, to enable a user to access the network resource. An anti-phishing module accesses the network resource and receives a network address, such as an IP-address and a port number. The anti-phishing module accesses a data base, such as an assigned name data base, to obtain ownership information, such as an owner name and country code, associated with the network address. The ownership information is examined to determine whether a network address is associated with a valid owner that is related to the source identifyier. If the network address's ownership is not trusted, a warning is optionally provided indicating that the resource identifier may be directed to a phishing site.

US patent application publication US 2003/0187949 A1 refers to a method for determining the geographic location of Internet users. The geographic location of an Internet user is determined and correlated with the Internet protocol address of the user during an active Internet session. This information is stored preferably by the user's Internet service provider, so that the Internet service can be provided to the user based on the user's location. The user's location can supplement a request for services made by the user so that the responding website or application will have additional information on which to base a reply. Alternatively, a website or application may initially seek to send messages and/or information to users within a predetermined geographic location. For locating the Internet user, the telephone number that is used by the user to gain Internet access is used for identifying the geographic location of the user.

U.S. Pat. No. 6,975,619 B1 describes a system and method for providing host geographic location information in a packet data network. A geographic location identification system, a method for a packet data network is disclosed wherein geographic location information is provided or derived at nodes that comprise a network. Upon a request from a requesting node, the geographic location information of one or more target nodes is provided to the requesting node. The target nodes may be user access nodes and/or network routing nodes.

SUMMARY OF THE INVENTION

In accordance with one aspect of the invention, a method is provided for identifying a location of a server. The method includes the steps of: requesting the server to deliver a message via a cellular network; receiving the message from the server by a cell of the cellular network; receiving geographic location information about the cell that received the message; and using the cell location information as information about the geographic location of the server.

According to a further aspect of the invention a location server is used for identifying the location of a server. The location server is configured to receive a network address of the server from a client; to request the server to deliver a message via a cellular network; to receive the message of the server by a cell of the cellular network; to receive a cell location information about the geographic location of the cell that received the message; and to send the cell location information to the client.

BRIEF DESCRIPTION OF THE DRAWINGS

The foregoing and other features and advantages of the invention will become apparent from the following more detailed description of embodiments of the invention, as it is illustrated in the accompanying drawing, in which.

DETAILED DESCRIPTION OF THE PREFERRED EMBODIMENTS

Figure 1:
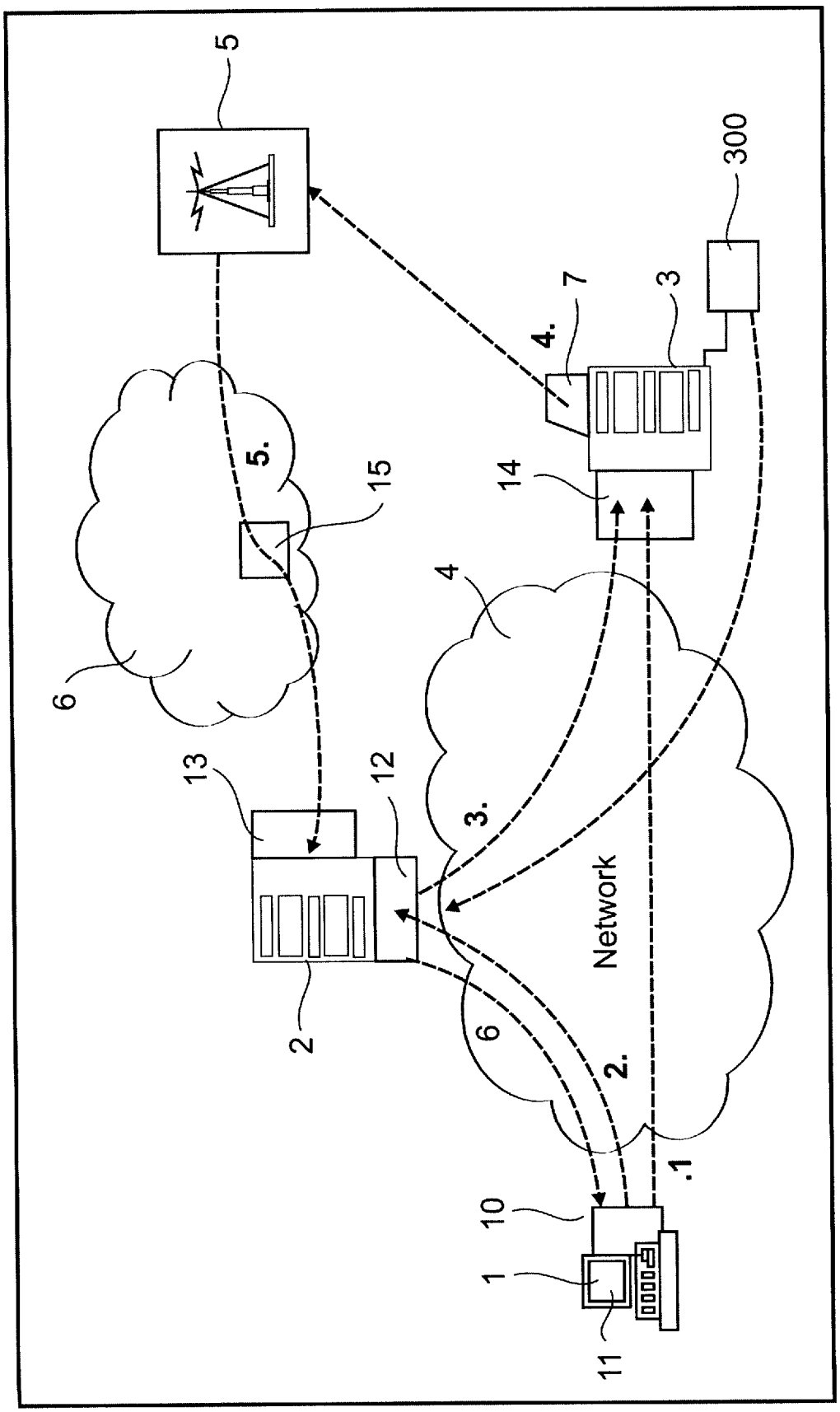
FIG. 1 is a block diagram showing an IP-network.

Referring to FIG. 1, a data system having a client 1, a location server 2 and a server 3, that may exchange data via a network 4, e.g. an Internet Protocol (IP) network, are shown. The server 3 includes a radio transmitter 7 for transmitting radio signals, e.g. according to the global system for mobile communications (GSM) for mobile phones. Other radio transmitter systems, e.g. UMTS or GPRS or EDGE or HSCSD could also be used for transmitting data from the server 3 to a receiving station 5, e.g. a GSM base station. The receiving station 5 is part of a cellular operator network 6, e.g. a GSM operator network. The operator network 6 includes an operator computer 15. The cellular operator network includes several receiving stations, wherein one receiving station may constitute a cell of the network. Each receiving station that receives a message transfers the message to the operator computer 15 with information identifying which receiving station received the message. The operator computer 15 has a location table with information on the geographic locations of the receiving stations.

The receiving station 5 is connectable with the operator computer 15 via the operator network 6. Furthermore, the operator computer 15 may be connectable to the location server 2. The connection between the operator computer 15 and the location server 2 may be embodied as a wireless connection using a mobile phone data transmission, as for example the global system for mobile communication. In another embodiment, a fixed telecommunication network may also be used.

The network may be embodied as an Internet Protocol network with a transmission control protocol for exchanging data and for exchanging data files and/or e-mail. However, depending on the used network, there may be other data transfer protocols that are used to exchange the data between the client 1, the location server 2 and the server 3.

The client 1 may be application software or a computer system that is configured to access a service on another computer system called a server by way of a network. The client may be any kind of computer or machine that is able to establish a data connection to another computer system. For example, the client may be a personal computer. The client comprises a first network interface 10 to send and to receive data to and/or from the network 4. Furthermore, the client 1 comprises a first I/O-interface 11 to input data and to output data. The first I/O-interface may include a keyboard and a display. Furthermore, the client 1 includes browser software that is configured to establish a data connection between the client 1 and the server 3. The browser software may, for example use a TCP-protocol to request the server 3 to establish a data connection and to exchange data with the server 3. For establishing a data connection, the browser may receive and store the network address of the server 3, for example the IP-address. The browser is also configured to establish a data exchange connection with the location server 2.

The location server 2 may be a server operating system or a server computer that is configured to run server applications or a server application software that runs on a computer system. The location server 3 can also be embodied as a personal computer that is configured to run server applications. The location server 2 comprises a second network interface 12 that is configured to establish a data exchange connection with the client 1 and the server 3 via the network 4. Furthermore, the location server 2 comprises a third interface 13 to establish a data connection with the operator network 6. Depending on the particular embodiment, the third interface 13 may be a radio receiver.

The operator computer 15 is configured to detect the geographic location of a receiving station 5 that receives a message for the location server 2. In the embodiment shown here, the operator computer has access to the location table in which the geographic locations of the receiving stations are stored. Each message that is delivered from a receiving station to the operator computer 15 additionally includes information identifying which receiving station delivers the message. The operator computer 15 detects the geographic location of the receiving station in the location table. Furthermore, the operator computer 15 is configured to receive a message from the receiving station 5 and to deliver a message to the location server 2 with a cell location information that includes the geographic location of the receiving station 5 that received the message from the server 3.

The server 3 includes a fourth network interface 14 which is configured to establish a data connection via the network 4 with the client 1 and which is configured to receive at least a message from the location server 2 via the network 4. The server 3 can be server application software that runs on a computer system or a server operating system that runs server application software. The server 3 may be embodied as a personal computer running a server application software. The third server 3 includes a radio transmitter 7 that is configured to send at least a message for the location server 2 to the receiving station 5. In another embodiment the server 3 may comprise or may be able to contact a geographic positioning system for example a Global Positioning System (GPS) 300.

Figure 2:
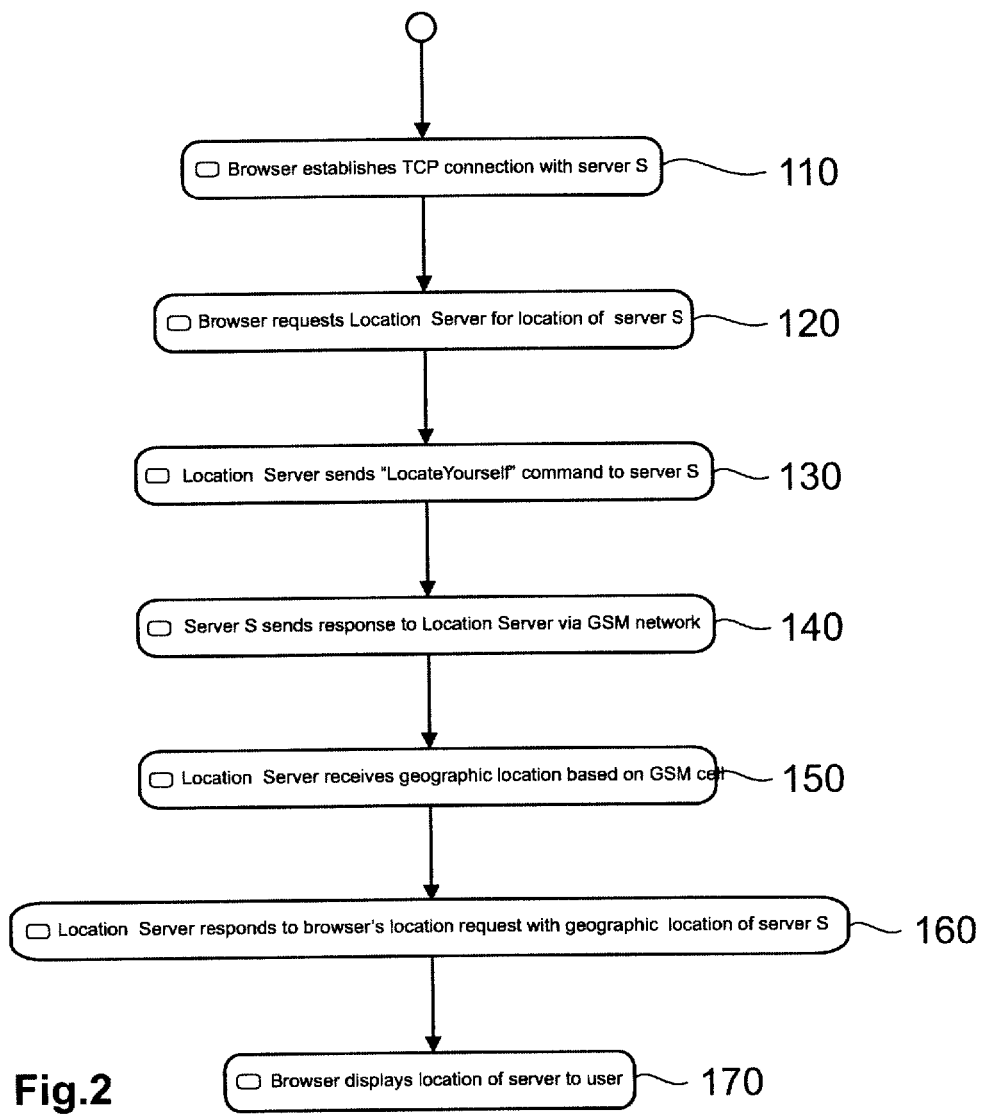
FIG. 2 is a block diagram of a method for identifying the location of a server.

Referring to FIG. 2 a schematic flow chart with a starting point 100 is shown. At the starting point 100, the client 1, the location server 2, the server 3, the network 4, the receiving station 5 and the operator network 6 may start to operate. At process step 110, the client 1 contacts the server 3 via the network 4 requesting establishment of a data connection. During the request, the server 3 transmits its network address to the client 1. In one embodiment, browser software of the client 1 initiates a TCP connection to the server 3 and saves the server's network address. Depending on the particular embodiment, other data protocols or processes may also be used for receiving a network address of the server 3 that is contacted by the client.

At process step 120, the client 1 sends a request to the location server 2 to detect a geographic location information about the server 3. The request comprises the network address of the server 3 that is also transmitted to the location server 2. The request may be performed by the browser of the client 1. In another embodiment, the client may send an identifier with the request, for example a session number that refers to the connecting of the server. The use of the identifier allows simultaneous sending of several requests referring to different servers to the location server.

In process step 130, the location server 2 sends a request via the network 4 to the server 3 to send a message back to the location sever 2, for example information on its geographic location. Depending on the particular embodiment, this request may be sent over a secure data connection from the location server 2 to the server 3. For example, an SSL data connection may be used for this request. In another embodiment, the request may additionally include the request that the server should send back its network address for example its Internet address with the message. If the server has several network addresses it should send back a list of its network addresses with the message.

In a further embodiment, the request may additionally comprise the request that the server should send back its network address, for example its Internet address with the message. If the server has several network addresses it should send back a list of its network addresses with the message.

Depending on the particular embodiment, the request may also include a request that the server 3 should send the answer about its geographic location via a cellular network 6 providing the cellular network address of the location server. In the case of a cellular phone network, the phone number is delivered to the server 3. In a further embodiment, the server 3 may have stored the information that, if the location server 2 sends a request to send a message back, for example to send information about the geographic location of the server 3, the server 3 will automatically send the answer via the cellular network 6.

The server 3 sends a message, for example containing information on the geographic location of the server 3 and its network address or a list of its network addresses via the radio transmitter 7 to the receiving station 5. The receiving station 5 which is part of a cell of the cellular network 6 transmits the message to the operator computer 15. This is done at process step 140. Depending on the particular embodiment, the server 3 may use a GSM data protocol to transmit the message to the receiving station 5 that may be embodied as a GSM base station.

At process step 150, the operator computer 15 detects the geographic location of the receiving station 5 that has received the message of the server 3. The operator computer 15 transmits location cell information that includes information on the geographic location of the receiving station 5 to the location server 2. The operator computer 15 transmits the message of the server 3 to the location server 2. The data transfer between the operator network 6 and the location server 2 may be performed via a GSM data connection or a fixed network using the third interface 13.

In process step 160, the location server 2 transmits the message of the server 3 and the cell location information to the client 1. The message may contain the network or the list of network addresses of the server. In a further embodiment, the location server 2 transmits only the cell location information to the client 1. The data transfer between the location server 2 and the client 1 may be performed via the network 4. In a further embodiment, the location server may also transmit the identifier with the message.

In process step 170, the client 1 may receive the message from server 3 with information on the geographic location of the server 3 and additionally the cell location information indicating the geographic location of the receiving station 5 that received the message of the server 3. The client may use the network address of the server received with the message to identify to which server the message refers. In a further embodiment, the client may use the identifier to identify the server to which the message belongs.

Figure 3:
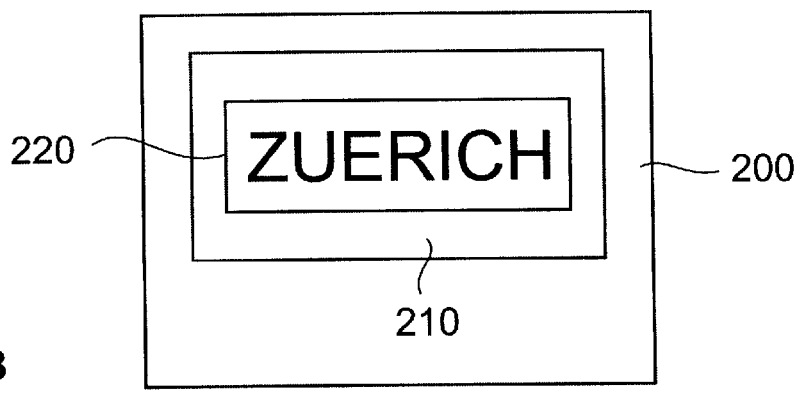
FIG. 3 is a schematic view of a display with a browser window.

In one embodiment, the geographic location of the server 3 that is included in the message and the geographic information of the cell location information may be displayed at the display of the client 1. Referring to FIG. 3, a display 200 with a browser window 210 are shown. In the browser window 210, a pop up window 220 is displayed indicating the geographic location of the server. The geographic location may be for example a city, a city area, a state or a country. A user may now have the possibility to check whether the geographic locations of the server and of the cell location information are in the same geographic region. Thus, it is possible for a user of the client 1 to check whether the server 3 is in a given geographic location that may correspond to the website of the server 3 or correspond to the server application that is provided by the server 3. For example, if a bank located in Europe or a company located in Europe is contacted via the server 3, it would be astonishing for a user of the client 1 if the server 3 is situated on the Fiji Islands. Therefore, the user may stop the establishing of a data connection with the server 3 and/or may not deliver important or confidential information to the server 3 because the server 3 might provide a phishing application.

In a further embodiment, only the geographic information of the cell location information is displayed at the client 1. A user may check the displayed geographic information and compare it to the application and/or the company that should be contacted via the server 3. If there is a hint of a phishing application the user may stop the establishing of the data connection with the server 3. Furthermore, the user may not deliver important or confidential information to the server.

In a further embodiment, the client 1 uses the cell location information to check whether it is compatible with the company and/or the server application that should be contacted on the server 3. If the geographic location of the network cell of the receiving station 5 is not within a predetermined region of the assumed geographic location of the server 3, the client 1 may disconnect the data connection to the server 3. At least, a warning information may be provided via the first I/O interface 11, for example, if the location of the receiving station 5 is more than 100 km away from the location of the server 3. Instead of the described cellular operator network any other data transmission system may be used that can locate a geographic location of a receipt of a message from a server.

In a further embodiment, the client's browser may keep and maintain a list of sensitive websites, securely connect the location server and display an icon obtained from the location server in a safe location in the browser. In a further embodiment, the server extentions may require an open port on server websites for receiving requests and a cellular interface for sending a reply message. The request should probably be sent using HTGP to avoid opening up additional ports on the server.

The server may send the reply messages by an SMS (short message service) using a mobile phone transmitter.

In a further embodiment, the location server might be combined with a GSM mobile phone in such a way that the location information is directly sent to a mobile phone of the client. The mobile phone might be used by a user of the client and the user might directly receive the data from the location server via the mobile phone.

In a further embodiment, instead of using a GSM network for locating the server, an implementation could use a tamper-proof GPS receiver that is attached to the server. Furthermore, using cryptographic methods for non-repudiation and authentication, the geographic location of the server 3 might be made available to the client 1 in a secure manner In a further embodiment, the server 3 may transmit its geographic position directly to the location server if a secure cryptographic connection is established between the server and the location server, whereby the identity of the server is authenticated without doubt. For this embodiment, it is not necessary to use a cellular network to determine the geographic location of the server.

In a further embodiment, the server may comprise an independent, fraud resistant geographic positioning system, for example a global positioning system, that allows the location server to determine the geographic position of the server. A fraud resistant determination of the geographic location of the server may be attained by cryptographically secure communication channels between the location server, the server and the global positioning system.

The server 3 may be constructed to contact a geographic positioning system 300, for example a global positioning system. The GPS 300 may determine the geographic position of the server 3 on request and deliver the geographic position of the server 3 as a server location information to the server 3 or to the location server 2. The server 3 delivers the server location information of the GPS 300, to the location server 2.

Although the above-described embodiments, refer to mobile radio systems, for example, GSM, UMTS, GPRS, EDGE, GSCSD, the method and the system are not limited to these data transmission systems, but may be implemented for any cellular network, whereby a geographic position of a cell of the cellular network may be known or may be determinable.

The preceding description describes the invention by using exemplary embodiments. While the foregoing is directed to specific embodiments, the above and further modifications may be made without departing from the spirit and scope of the invention, the scope being determined by the following claims.

What is claimed is:

1. A method for identifying a geographic location of an unknown first server, the method comprising:
   upon communication between the unknown first server and a client device, receiving, by a second server, a location request sent by the client device, the second server comprising a location server to acquire information about the geographic location of the first server, the location request including identifying information about the first server;
   the second server using the identifying information in a delivery request, sent over a first network, that the first server deliver a message to the second server, via a second network, the second network comprising a cellular network, the requested message to include additional information about the geographic location of the first server;
   the second network having a plurality of cells for communication with respective geographic locations;
   receiving the requested message sent by the first server via radio transmission over the second network;
   the second server receiving cell location information of the geographic location of the cell that received the message;
   the second server analyzing the cell location information to identify a particular cell, in the plurality of cells, that received the requested message;
   identifying the geographic location of the first server based on the cell location information and verifying identity of the first server based on the identified geographic location to produce verification information; and
   sending, to the client device as a response to the location request, the verification information and the identified geographic location of the first server.

2. The method of claim 1, further comprising:
   connecting the first server to establish a data connection;
   receiving an answer signal with a network address of the first server;
   contacting the first server using the network address; and
   requesting the first server to reply to a message via the second network.

3. The method of claim 1, further comprising displaying the geographic location of the first server.

4. The method of claim 3, further comprising displaying the geographic location of the first server in a browser window of a display.

5. A method for identifying a geographic location of a communicating server unknown to a network comprising, wherein the network includes a second server, the method comprising:
   receiving a network address of the communicating server from a client;
   the second server requesting, over a first network, the communicating server to deliver a message, via a second network, to the second server, the requested message including identifying information about the communicating server, the second network comprising a cellular network;
   the second server receiving the requested message from the communicating server via a cell of the second network;
   receiving a cell location information about the geographic location of the cell that received the requested message and identifying the geographic location of the communicating server previously unknown to the network and verifying authenticity of the communicating server based on the geographic location by comparing the geographic location obtained from the first server with a stored table of similarly located servers; and
   sending the cell location information to the client via radio frequency transmission.

6. The method of claim 5, further comprising:
   requesting the communicating server to deliver server location information about the geographic location of the communicating server via the second network;
   receiving the server location information via the cell of the second network; and
   sending the server location information to the client.

7. The method of claim 5, further comprising receiving a request from the client to contact the communicating server and to request a message from the communicating server via the second network.

8. The method of claim 5, further comprising receiving a request from the client to request the communicating server to deliver its network address.

9. A location server comprising:
   a first network interface configured to receive a network address of a server from a client;
   the first network interface having an input and an output interface configured to request the server to deliver a message via a cellular network;
   the data interface also configured to receive the message of the server by a cell of the cellular network by radio transmission;
   a second network interface configured to receive a cell location information about the geographic location of the cell that received the message;
   the second network interface also configured to send the cell location information to the client; and
   a location table configured to verify authenticity of the server location by comparing information sent by the server and its actual geographical location based on comparison with other similar locations in the location table.

10. The location server of claim 9, wherein the second network is further configured to request about delivering geographic location about another server via the cellular network, as well as receive location information via the cell of the cellular network, and to send the server location information to the client.

11. The method of claim 1, wherein a client requests information about the first server from the second server.

12. The method of claim 11, wherein the second server shares information about the first server's geographic location with the first server.

13. The method of claim 12, wherein the geographic location is provided to the client on a display.

14. The method of claim 1, wherein the delivery request is sent over the first network using a secure data connection.

15. The method of claim 1, wherein the delivery request includes a phone number of the location server on the second network.

16. A system configured to identify a geographic location of an unknown first server, comprising:
   a second server, the second server comprising a location server configured to:
   receive a location request from a client device that is in communication with the unknown first server, the location request including identifying information about the first server;
   use the identifying information in a delivery request, sent over a first network, that the first server deliver a message to the location server, via a second network, the second network comprising a cellular network, the requested message to include additional information about the geographic location of the first server, and the second network having a plurality of cells for communication with respective geographic locations;

receive the requested message sent by the first server via radio transmission over the second network;

receive cell location information of the geographic location of the cell that received the message;

analyze the cell location information to identify a particular cell, in the plurality of cells, that received the requested message;

identify the geographic location of the first server based on the cell location information and verifying identity of the first server based on the identified geographic location to produce verification information; and send, to the client device as a response to the location request, the verification information and the identified geographic location of the first server.

17. The system of claim 16, wherein the client device is configured to contact the second server to establish a data connection and to receive an answer signal with a network address of either server, and allow a reply message to be sent back to it.

* * * * *